United States Patent

[11] 3,626,366

| [72] | Inventor | George M. Tam<br>St. Joseph, Mich. |
|---|---|---|
| [21] | Appl. No. | 854,675 |
| [22] | Filed | Sept. 2, 1969 |
| [45] | Patented | Dec. 7, 1971 |
| [73] | Assignee | The Bendix Corporation |

[54] SELF-LATCHING DIFFERENTIAL PRESSURE SWITCH
5 Claims, 1 Drawing Fig.

[52] U.S. Cl. ................................................ 340/52,
116/70, 188/1 A, 188/152
[51] Int. Cl. ........................................................... B60t 17/22
[50] Field of Search ............................................ 340/52 C;
200/82 D; 188/1 A, 152; 116/70

[56] References Cited
UNITED STATES PATENTS

| 3,480,333 | 11/1969 | Stelzer | 188/152 |
| 3,336,451 | 8/1967 | Burton | 200/82 D |
| 3,382,333 | 5/1968 | Ihnacik, Jr. | 340/52 C |
| 3,427,416 | 2/1969 | Papin | 200/82 D |

*Primary Examiner*—John W. Caldwell
*Assistant Examiner*—Glen R. Swann, III
*Attorneys*—C. F. Arens and Plante, Arens, Hartz, Hix and Smith

ABSTRACT: A switch responsive to differential pressure between first and second hydraulic brake systems three pistons arranged in end-abutting relationship in the bore of a housing. The outermost ends of the two outer pistons and the corresponding ends of the housing define a pair of fluid chambers, each of which is in communication with one of the two hydraulic systems. The inner piston actuates a warning device when it is shifted in the bore by one of the two outer pistons due to a pressure differential created in the two chambers resulting from a defective system. When the defective system is repaired, the first brake application recenters the three pistons, thereby deactivating the warning device.

PATENTED DEC 7 1971
3,626,366
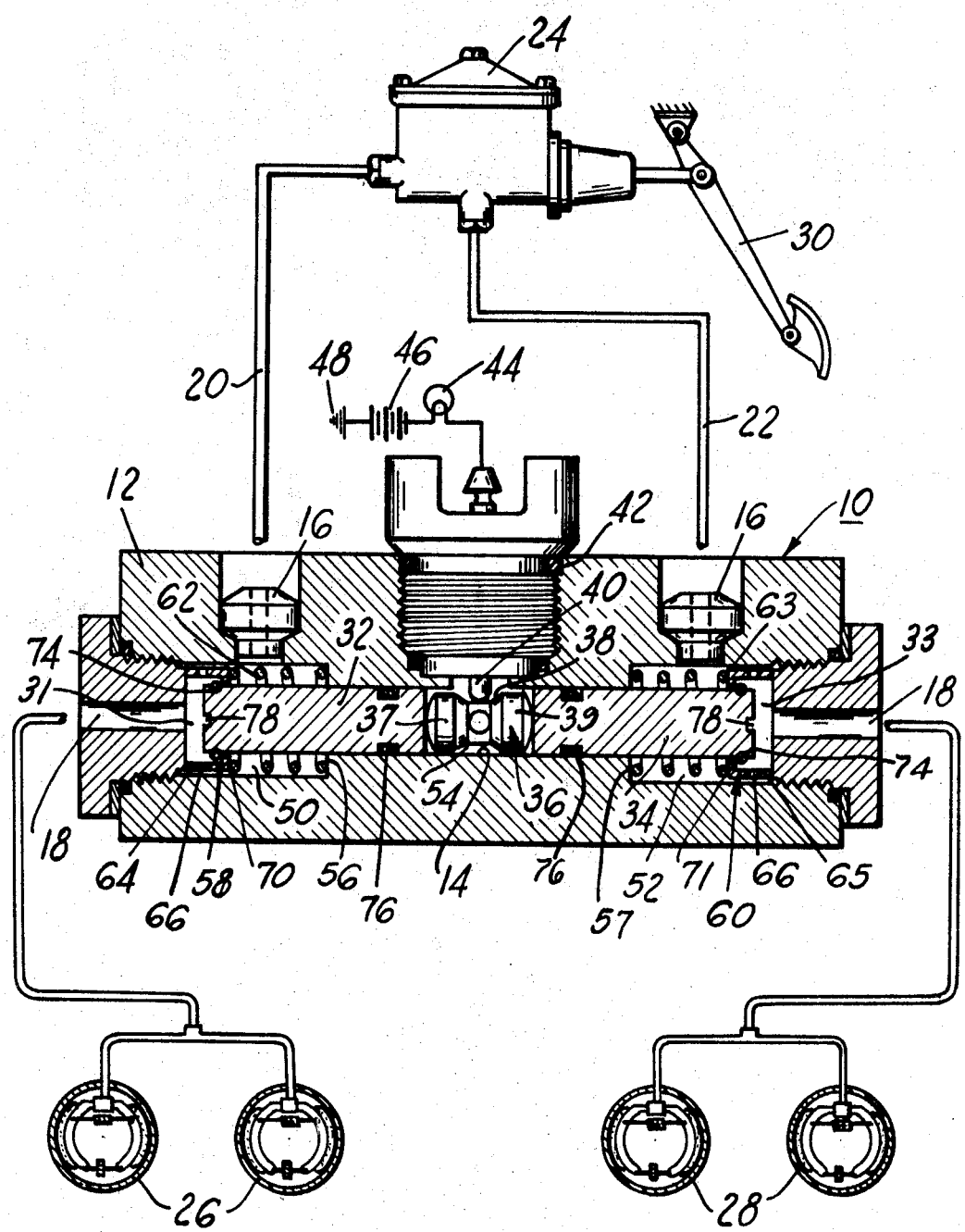
INVENTOR.
GEORGE M. TAM
BY
ATTORNEYS

3,626,366

SELF-LATCHING DIFFERENTIAL PRESSURE SWITCH

BACKGROUND OF THE INVENTION

This invention relates to a warning device to indicate a loss of pressure in one side of a dual hydraulic vehicular braking system.

In recent years, split system master cylinders that develop pressure in separate hydraulic systems for actuating the front and rear brakes have been provided on most vehicles. In such systems, a failure in one of the hydraulic systems will leave the other set of brakes operative. However, even though a substantially greater pedal effort is required to stop a vehicle using only two brakes, the operator might not be apprised of the defective condition of his brakes until a very quick stop is required. Therefore, it has become customary to provide a warning signal in the vehicle operator's compartment to indicate a failure in one of the brake systems. However, most of these warning devices provide a warning signal which operates solely during a brake application. An inattentive driver might overlook such a signal and be unaware of his defective brakes until an emergency arises. Those warning devices that do provide a continuous signal either require disconnecting the brake lines or the employment of some other cumbersome procedure to reset the warning switch after the brake system has been repaired.

SUMMARY OF THE INVENTION

Therefore, an important object of my invention is to provide a warning device that continuously warns the vehicle operator of the defective condition of his brakes until the defect is corrected.

Another important object of my invention is to provide a latching-type warning device that may be reset upon repair of the brakes without disassembly of the brake lines or differential pressure switch.

Yet another important object of my invention is to provide a latching warning switch which is automatically reset by the first normal brake application after the brakes are repaired.

DESCRIPTION OF THE DRAWING

The sole FIGURE of the drawing is a schematic view of a brake system with a warning switch made pursuant to the teachings of my present invention shown in cross section.

DETAILED DESCRIPTION

Referring now to the drawing, a warning switch 10 is mounted on a vehicle at a point where it may be electrically grounded, such as the vehicle firewall. Switch 10 includes a housing 12 defining a bore 14 therewithin having a pair of fluid inlets 16 and a pair of outlets 18. Each of the inlets 16 and outlets 18 is connected to one of a pair of hydraulic systems 20 or 22. Hydraulic system 20 is also connected to one side of a split master cylinder 24 and to the front wheel brakes 26. Hydraulic system 22 is connected to the other side of the master cylinder 24 and to the rear wheel brakes 28. Pressure is developed in the master cylinder 24, and therefore in the hydraulic systems 20 and 22, in the normal manner by depressing a pedal 30 mounted in the operator's compartment of the vehicle.

A pair of outer pistons 32 and 34 and an inner piston 36 are slidably arranged in end-abutting relationship in the bore 14. Pistons 32 and 34 cooperate with the walls of the bore 14 to define first and second chambers 31 and 33 in fluid communication with hydraulic systems 20 and 22, respectively. Inner piston 36 has a pair of ramp surfaces 38 formed thereon adapted to engage a plunger 40 upon sliding movement of the piston 36 and force the plunger 40 in a direction perpendicular to the axis of the bore 14. Piston 36 further includes a pair of circumferentially extending lands 37, 39 adjacent the outermost ends of the piston. Plunger 40 is reciprocable in a fitting 42 carried by the housing 12 and is adapted to close a pair of switch contacts (not shown) in the fitting 42 to activate a warning device 44 connected to the contacts, to the vehicle storage battery 46, and to an electrical ground 48.

The bore 14 is stepped to present a pair of larger diameter portions 50 and 52 and a smaller diameter portion 54 with shoulders 56 and 57 between the smaller portion 54 and a corresponding one of the larger diameter portions 50 or 52. The smaller diameter portion 54 slidably receives the inner piston 36 and one end of each of the outer pistons 32 and 34 which project therefrom into their corresponding larger diameter portions 52 and 54 respectively. Portions 52 and 54 also slidably receive corresponding sleeve members 58 and 60 respectively, which in turn slidably support their corresponding pistons 32 and 34. The outer end of each sleeve 58 and 60 is yieldably biased into engagement with a corresponding end of the bore 14 by coiled springs 62 and 63 interposed between the shoulders 56 and 57 and a corresponding sleeve 58 and 60 respectively. Each sleeve 58 and 60 has a cylindrical wall section 64, 65 extending parallel to the walls of the bore 14. Each of the wall sections 64, 65 is provided with a plurality of circumferentially spaced openings 66 to permit free flow of fluid from the inlet to the outlet. One end of each of the sleeves 58 and 60 is adapted to engage a corresponding end of the bore, and a radially inwardly projecting, circumferentially extending shoulder 70, 71 is formed on the other end of the sleeves 58 and 60, respectively. Each shoulder 70, 71 is adapted to engage a snapring 74 mounted on the outer end of each of the pistons 32 and 34 to prevent movement of the pistons past a corresponding shoulder 70 or 71. However, relative sliding movement between the pistons 32 and 34 and the corresponding sleeves 58 or 60 along a limited axial distance between the shoulders 70, and 71 and the end of the bore is permitted. Channels 78 are provided in the outermost ends of the pistons 32 and 34 so that fluid may be communicated to the end of a corresponding piston when the latter is abutted against the end of the bore. O-ring seals 76 are provided circumscribing each of the pistons 32 and 34 to prevent fluid from leaking from the hydraulic systems 20 and 22 past the pistons 32 and 34.

MODE OF OPERATION

Assuming no malfunction in the hydraulic systems 20 or 22, the pistons 32, 34, and 36 will remain centered in the bore 14 due to the action of the springs 62 and 63, and because equal hydraulic pressures are acting on the ends of the pistons 32 and 34. However, should a failure occur in one of the hydraulic systems 20 or 22, for example, in the hydraulic system 20, fluid pressure in the chamber 31 acting on the piston 32 during a brake application is abruptly reduced. The higher pressure in the chamber 33 acting on the piston 34 forces the pistons 32, 34 and 36 and the sleeve 60 to the left viewing the FIGURE, until the end of piston 32 contacts the end of the bore, thereby compressing the spring 63. Since piston 36 is driven to the left, the ramp 38 will shift the plunger 40 upwardly, thereby closing the contacts in the fitting 42 and actuating the warning signal 44. After shifting of the piston, the land 39 will be positioned directly below the plunger 40, maintaining the latter in its upper position.

Upon release of the brakes, the pressure in the chamber 33 is reduced permitting the spring 63 to force the sleeve 60 to the right viewing the FIGURE. Since the shoulder 70 on the sleeve 60 engages the snapring 74 on the piston 34, movement of the sleeve toward the end of the bore will also force the piston 34 to the position illustrated in the FIGURE. However, pistons 32 and 36 remain shifted to the left since there are no spring or hydraulic forces acting on them, and the outermost end of the piston 32 will remain in contact with the end of the bore. Therefore, the plunger 40 will remain in the upper position, maintaining the electrical contacts (not shown) closed. The warning device 44 will then remain actuated even though the brakes are released to provide the vehicle operator with a continuous indication of a brake malfunction.

Upon repair of the brakes, the first normal brake application repressurizes the chamber 31. This pressure is communicated with the outlet 18 and with the outermost face of the piston 32 through the channels 78. After sufficient pressure builds up in the brake lines, the fluid pressure will force the pistons 32 and 36 to the right viewing the FIGURE until the snapring 74 on the piston 32 engages the shoulder 70 on the sleeve 58, whereupon, movement of the piston 32 is terminated due to the bias of the spring 62 acting against the sleeve 58. Since the piston 36 is then recentered in the bore, the plunger 40 drops downwardly to open the electrical contacts (not shown) thereby discontinuing operation of the warning device 44.

I claim:

1. In a switch responsive to a pressure differential between first and second hydraulic systems:

a housing defining a bore therewithin;

piston means slidably mounted in said bore and defining first and second chambers between opposite ends of the piston means and corresponding ends of the bore;

said first and second chambers being in fluid communication with said first and second hydraulic systems respectively;

said piston means including an inner section and a pair of outer sections, one end of each of said outer sections normally engaging opposite ends of said inner section, said inner section and the outer sections shifting as a unit from a first position to a second position in response to a pressure differential between said first and second chambers due to loss of fluid pressure in one of said hydraulic systems, said inner section and one of said outer sections remaining in said second position after fluid pressure in the other hydraulic system is released;

switch means responsive to movement of said inner section to said second position for actuating a warning device; and resilient means yieldably urging the other outer section toward its first position after fluid pressure in the other hydraulic system is released;

said inner section and said one outer section returning to their corresponding first positions after substantially equal pressures are again established in said first and second hydraulic systems.

2. The invention of claim 1; and stop means slidable in said bore and operably connected to each of said outer sections and to said resilient means, said stop means permitting substantially uninhibited movement of each of said outer sections toward its corresponding adjacent end of the bore, said stop means cooperating with said resilient means to urge each of said outer sections toward their corresponding first position upon movement of the latter away from their corresponding adjacent ends of the bore.

3. The invention of claim 2 said bore being stepped to present larger diameter portions adjacent the ends of the bore and a smaller diameter portion therebetween;

said stop means including a pair of sleeves;

each of said sleeves being reciprocable in a corresponding larger diameter portion of the bore;

each of said outer sections being slidably received by one of said sleeves and said smaller diameter portion.

4. The invention of claim 3:

there being oppositely facing shoulders between each of said larger diameter portions and said smaller diameter portion;

said resilient means being springs interposed between each of said shoulders and a corresponding sleeve.

5. The invention of claim 4:

each of said sleeves having a radially inwardly extending portion adapted to engage an outwardly projecting shoulder on the corresponding outer section upon movement of the latter away from its corresponding adjacent end of the bore.

* * * * *